(12) United States Patent
Licitar (10) Patent No.: US 10,065,169 B2
(45) Date of Patent: *Sep. 4, 2018

(54) METHOD AND APPARATUS FOR INCREASING GASEOUS CONTENT OF A HYDROCARBON FUEL

(71) Applicant: ULLA SCHØTT JUUL-HANSEN, Luxembourg (LU)

(72) Inventor: Antonijo Licitar, Rijeka (HR)

(73) Assignee: ULLA SCHØTT JUUL-HANSEN, Luxembourg (LU)

( * ) Notice: Subject to any disclaimer, the term of this patent is extended or adjusted under 35 U.S.C. 154(b) by 128 days.

This patent is subject to a terminal disclaimer.

(21) Appl. No.: 14/915,727

(22) PCT Filed: Sep. 3, 2014

(86) PCT No.: PCT/EP2014/068701
§ 371 (c)(1),
(2) Date: Mar. 1, 2016

(87) PCT Pub. No.: WO2015/032801
PCT Pub. Date: Mar. 12, 2015

(65) Prior Publication Data
US 2016/0193583 A1    Jul. 7, 2016

(30) Foreign Application Priority Data

Sep. 3, 2013   (DK) .............. PA 2013 00496

(51) Int. Cl.
*B01J 19/08* (2006.01)
*B01J 19/24* (2006.01)
(Continued)

(52) U.S. Cl.
CPC .......... *B01J 19/087* (2013.01); *B01J 19/244* (2013.01); *C10L 1/04* (2013.01); *F02M 27/04* (2013.01);
(Continued)

(58) Field of Classification Search
CPC ................... B01J 19/087; B01J 19/244; B01J 2219/0801; B01J 2219/0803;
(Continued)

(56) References Cited

U.S. PATENT DOCUMENTS

| 5,342,586 A | 8/1994 | Park | |
| 2007/0108056 A1* | 5/2007 | Nyberg | B01D 61/44 204/554 |
| 2014/0130401 A1* | 5/2014 | McAlister | C10L 1/1824 44/307 |

FOREIGN PATENT DOCUMENTS

| DE | 102011009498 A1 | 8/2012 |
| WO | 2010014071 A1 | 2/2010 |
| WO | 2013075832 A1 | 5/2013 |

* cited by examiner

*Primary Examiner* — Xiuyu Tai
(74) *Attorney, Agent, or Firm* — Richard M. Goldberg (57) ABSTRACT

An apparatus and method for treating liquid hydrocarbon fuel for increasing the gaseous content of the fuel includes a treatment unit for increasing the gaseous content of the fuel, the treatment unit including an inlet for receiving hydrocarbon fuel and an outlet for discharging a treated hydrocarbon fuel, and a plurality of concentric, spaced apart circular tubes of substantially equal lengths and of a non-magnetic material, the tubes defining a plurality of intermediary spaces, defining flow paths for the hydrocarbon fuel between the inlet to the outlet, and an innermost tube and an outermost tube are electrically connected to opposite poles of an electrical current generator configured for supplying a (Continued)

fluctuating current to thereby increase the gaseous content of the hydrocarbon fuel flowing through the intermediate tank.

10 Claims, 3 Drawing Sheets

(51) Int. Cl.
*F02M 27/04* (2006.01)
*F23K 5/08* (2006.01)
*C10L 1/04* (2006.01)

(52) U.S. Cl.
CPC .............. *F02M 27/045* (2013.01); *F23K 5/08* (2013.01); *B01J 2219/0801* (2013.01); *B01J 2219/0803* (2013.01); *B01J 2219/0869* (2013.01); *B01J 2219/0877* (2013.01); *C10L 2290/38* (2013.01); *C10L 2290/46* (2013.01); *C10L 2290/58* (2013.01); *F23K 2301/101* (2013.01)

(58) Field of Classification Search
CPC ........ B01J 2219/0869; B01J 2219/0877; B01J 19/088; B01J 2219/0809; B01J 2219/083; B01J 2219/0841; B01J 2219/0875; B01J 2219/0883; B01J 2219/0894; C10L 1/04; C10L 2290/46; C10L 2290/58; C10L 2290/38; F02M 27/04; F02M 27/045; F23K 5/08; F23K 2301/101; C02F 1/487; C02F 2303/04; H01J 37/32541; H01J 37/32568; F01N 3/0892; F01N 2240/28; H05H 1/2406; H05H 2001/2456; B82Y 30/00; Y02T 10/22; A61L 2/02
See application file for complete search history.

METHOD AND APPARATUS FOR INCREASING GASEOUS CONTENT OF A HYDROCARBON FUEL

FIELD OF THE INVENTION

The present invention relates to a method and device for treating liquid hydrocarbon fuels combustion engines in cars, trucks, and ships or other working or power plants or engines such as jet engines and turbines as well as boilers, burners and other devices which use hydrocarbon fuel.

BACKGROUND OF THE INVENTION

Presently, various types of engines are used for generating rotary power and most of them are running on fossil fuels, like gasoline, diesel, natural gas, biodiesel, etc. Since the conception of the internal combustion engine engineers have attempted to reduce the size of fuel particles as much as possible when injecting liquid fuel into a cylinder to obtain better burning conditions. For this purpose we have nowadays various advanced fuel injection systems, like common rail and other types of fuel injection systems injections for injecting fuel into the engine cylinders. Even nowadays engineers are still attempting to reduce the size of the liquid fuel droplets/particles as much as possible with high pressure.

There are many technical problems that need to be solved if really good conditions for burning are to be obtained. High pressure pumps, piping, injectors and many parts connected in the system are very complicated and with more possible problems and faults if extremely high pressure is used and maintenance gets more complicated.

Basically, all kinds of hydrocarbon fuel need to be blended with oxygen from air, e.g. in a cylinder, to get a condition of burning or oxidizing.

Oxidation of fuel in the cylinder is directly connected to the dimensions or better to say to different state of matter in the fuel and in liquid form the hydrocarbon fuel is completely different than in gas form. Much better burning and oxidation conditions can be obtained if gaseous fuel is used, and nowadays there already have many applications with gaseous fuel systems on cars, trucks and other engines. These engines are usually diesel or gasoline engines. In both cases a separate system for gaseous fuel injection and for liquid state fuel injection needs to be installed on the engine, i.e. two separate injection systems are required. Usually, gaseous fuel comes into the engine cylinder though the air intake and often there are operation problems with other parts of fuel system, like injectors, high pressure pumps, etc. Sometimes the gaseous fuels have very poor lubrication characteristics compared to liquid fuel and therefore after some time of use parts of the fuel injection system can be damaged.

At the same time gas installation systems on engines are complicated, expensive and we still need to fill liquid fuel into a separate tank placed somewhere in the car or other vehicle thereby wasting space that can be used for other purposes. The gas tank needs to be filled with gaseous fuel, which requires an infrastructure like gas stations distributed over a region. Filling the gaseous fuel into the tank can be even dangerous and hazardous matters are to be taken care of.

Gas as a fuel is more dangerous than liquid fuel because it can be better mixed with oxygen in the air and even from an explosive mixture explosive in a given concentration.

There is though one more reason for using gaseous fuel for combustion. Nowadays, we use many different kinds of gases like natural gas extracted from the gas fields and gas produced from fuel in refinery as fuel. In order to produce gas from fossil fuel energy needs to be added and this can be as much as 35% of energy that can be produced by the gaseous fuel. So the overall efficiency when producing gas from liquid fossil fuels is not good.

Gaseous fuels have some benefits as well, like less pollution and for example better burning conditions and fewer pollutants like NOx and CO.

This is the main reason why it would be of great advantage to be able to use partly gasified liquid fuel.

SUMMARY OF THE INVENTION

On this background, it is an object of the present invention to provide an apparatus for treating liquid hydrocarbon fuel so that it will have an increase gaseous content.

This object is achieved by providing an apparatus for treating liquid hydrocarbon fuel for increasing the gaseous content of the hydrocarbon fuel for use with internal combustion engines, boilers, heating units, gas turbines or any other hydrocarbon fuel burning apparatus, the apparatus comprising: a source of liquid hydrocarbon fuel, a treatment unit, for treating the hydrocarbon fuel, the treatment unit comprising: an inlet for receiving the hydrocarbon fuel into the treatment unit, an outlet for discharging a treated hydrocarbon fuel from the treatment unit, and a pump for supplying a flow of hydrocarbon fluid to the inlet, an assembly of two or more tubes of a non-magnetic material, the two or more tubes having a circular cross-section, and the assembly being arranged between the inlet and the outlet, the two or more tubes have different diameters, have substantially equal lengths, are arranged in length alignment, and are arranged concentrically with the tubes defining a plurality of intermediary spaces, thus providing flow paths for the hydrocarbon fuel between the inlet to the outlet, an inner tube and an outer tube being electrically connected to an electrical current generator, the electrical current generator is configured for supplying a fluctuating current with an inner tube being connected to a one pole of the electrical current generator and an outer tube being connected to the other pole of the electrical current generator to thereby increase the gaseous content in hydrocarbon fuel through the intermediate spaces, and the electrical current generator being configured to adapt the generated current to the magnitude to the flow of hydrocarbon fluid to the inlet.

By treating the hydrocarbon fuel with the treatment apparatus the gaseous content of the hydrocarbon fuel increases. This provides for a better and more efficient combustion process in the apparatus where the fuel is combusted. The gasified fuel is in the a state of foam with some part of liquid in between gas molecules. The gaseous part can be different type of gas like Methane, Ethane and other kind of combination gases like a hydrogen and oxygen. These gases are bounded together with liquid foam and like a mix gas and liquid can be delivered to the engines high pressure pump and injected in to e.g. a cylinder of a combustion engine.

Normal diesel engines cannot use gas as fuel because the high pressure pump cannot press enough quantity of gas in to the burning chamber because of the density it is not possible to use gas directly to the fuel system and nowadays an alternative gas fuel injection system uses the air intake is to deliver the gas in to the burning chamber.

With the present invention the gaseous fuel can be delivered by a conventional diesel engine fuel supply like with normal liquid fuel but with a higher combustion efficiency then liquid diesel fuel.

Part of the liquid is inside of gas acts like an adhesive in between gas bubbles and has the purpose to improve pressure in the high pressure pump and lubricate high pressure pump and at same time other parts of the system as well.

This is a main reason and main difference in between the present invention of gasified liquid and the known systems fuel because in the present invention gaseous fuel is used with a conventional diesel fuel injection system without dedicated injection system for the gaseous fuel.

In an embodiment the apparatus further comprises a control unit connected to the pump and to the treatment unit the control unit being configured to control the speed of the pump and configured to adapt the fluctuating current generated by the current generator in accordance with the output of the pump.

In an embodiment the apparatus further comprises a temporary storage tank comprising a treated and not treated hydrocarbon fuel, a first conduit with the pump therein and connecting the tank to the inlet of the treatment unit and a second conduit connecting the outlet of the treatment unit to the tank.

In an embodiment of the apparatus the temporary storage tank is adapted to be pressurized and wherein an accumulator is operatively connected to the temporary storage tank in order to level out pressure fluctuations in the temporary storage tank.

In an embodiment the apparatus further comprises one or more pressure sensors that provide a signal indicative of the pressure in the temporary storage tank.

In an embodiment the control unit is configured to control the output of the pump and configured to adjust the fluctuating current to the monetary output of the pump.

In an embodiment the apparatus further comprises a fuel tank that is connected to the temporary storage tank and a pump that is arranged to pump fuel from the atmospheric pressure tank to the pressurized temporary storage tank In an embodiment of the apparatus the fluctuating current is a pulsed current with two phase shifted waves that are slightly different in frequency so as to cause resonance.

The object above is also achieved by providing a method of treating liquid hydrocarbon fuel for increasing the gaseous content of the hydrocarbon fuel for use with internal combustion engines, boilers, heating units, gas turbines or any other hydrocarbon fuel burning apparatus, the method comprising: providing a treatment unit, for treating the hydrocarbon fuel, the treatment unit comprising: an inlet for receiving the hydrocarbon fuel into the treatment unit, an outlet for discharging a treated hydrocarbon fuel from the treatment unit, and an assembly of two or more tubes of a non-magnetic material, the two or more tubes having a circular cross-section, and the assembly being arranged between the inlet and the outlet, the two or more tubes have different diameters, have substantially equal lengths, are arranged in length alignment, and are arranged concentrically with the tubes defining a plurality of intermediary spaces, thus providing flow paths for the hydrocarbon fuel between the inlet to the outlet, connecting an inner tube and an outer tube electrically to the poles of an electrical current generator, supplying a fluctuating current with the current generator with an inner tube being connected to one pole of the electrical current generator and an outer tube being connected to another pole and simultaneously flowing the hydrocarbon fuel through the intermediary spaces to thereby increase the gaseous content in hydrocarbon fuel, and adapting the generated current to the magnitude to the flow of hydrocarbon fluid to the inlet.

Tubes are referred to in the present context as any hollow structure having a longitudinal extension and a substantially circular cross-section such as a tube, pipe or cylinder.

In an embodiment the treatment unit further comprises a distribution chamber connected to the inlet for distributing the flow of the hydrocarbon fuel between the intermediary spaces. Also, the treatment unit comprises a collecting chamber connected to the outlet for collecting the flow of the treated hydrocarbon fuel from the intermediary spaces, and a tank comprising a hydrocarbon fuel, a first conduit connecting the tank to the inlet of the treatment unit, a second conduit connecting the outlet of the treatment unit to the tank.

In an embodiment the treatment unit further comprises a surface on an inside of the outermost tube of the device being coated with metal particles, and furthermore the outermost tube is insulated from the adjacent tube with an electrically insulating material. Also, two or more permanent magnets in pole orientation south to south are arranged in an end of the tubes closest to the inlet of the fuel, and the permanent magnets arranged on two opposite sides of the tubes with the south pole orientation of the permanent magnets facing the tubes, and finally a surface on an outside of at least one of the inner tubes comprising activated carbon.

In an embodiment the treatment unit is made from tubes of stainless steel.

In an embodiment the treatment unit is made from tubes of an electrically conductive non-magnetic material.

In an embodiment the treatment unit further comprises a treatment material arranged in the intermediary space in between the tubes.

In an embodiment the treatment material in the treatment chamber is thin wire of natural silk.

In an embodiment the treatment material in the treatment chamber is another material having properties similar to those of silk.

In an embodiment of the invention filling of the treatment unit is controlled with a mixture control valve.

In an embodiment the treatment unit comprises metal particles selected from but not limited to the group of, Al, Si, Zn, FeO and CuO.

In an embodiment a fuel processor unit is part of the treatment unit.

In an embodiment, the fuel processor unit forms the innermost intermediary space of the treatment unit.

In an embodiment the metal particles in the treatment unit are grounded to release charge.

A specialized discharge system may be used comprising two circuits charging and discharging separately with different timing, such that charging and discharging of the two circuits is not performed in time but desynchronized such that one circuit is charging while the other circuit is discharging.

Also, the invention relates to a method of providing a treated hydrocarbon fuel to internal combustion engines, burners, heating units or gas turbines by application of an apparatus comprising a treatment unit according to the invention.

Furthermore, the invention relates to a combustible treated fuel obtained by the method of providing a treated hydrocarbon fuel to internal combustion engines, burners, heating units or gas turbines by application of an apparatus comprising a treatment unit according to the invention.

In an embodiment of the invention the apparatus furthermore comprises a hydrocarbon fuel burning machine. Also, a third conduit fluidly connecting the tank to the hydrocarbon fuel burning machine and a fourth conduit connecting from the hydrocarbon fuel burning machine to the tank.

In an embodiment of the invention the apparatus furthermore comprises a fuel cell.

In an embodiment of the invention the apparatus furthermore comprises a plurality of inline pumps for distribution of fuel in the apparatus.

Further objects, features, advantages and properties of the apparatus and method according to the disclosure will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF THE INVENTION

The following embodiments and definitions relate to the device and the method of the present invention. In the present context the device and the method are applicable for devices that use hydrocarbon fuel such as, but not limited to combustion engines, boilers, burners and gas turbines.

In the present context the term fuel processor refers to a unit for treating liquid hydrocarbon fuel such the gaseous content of the fuel increases.

Figure 1:
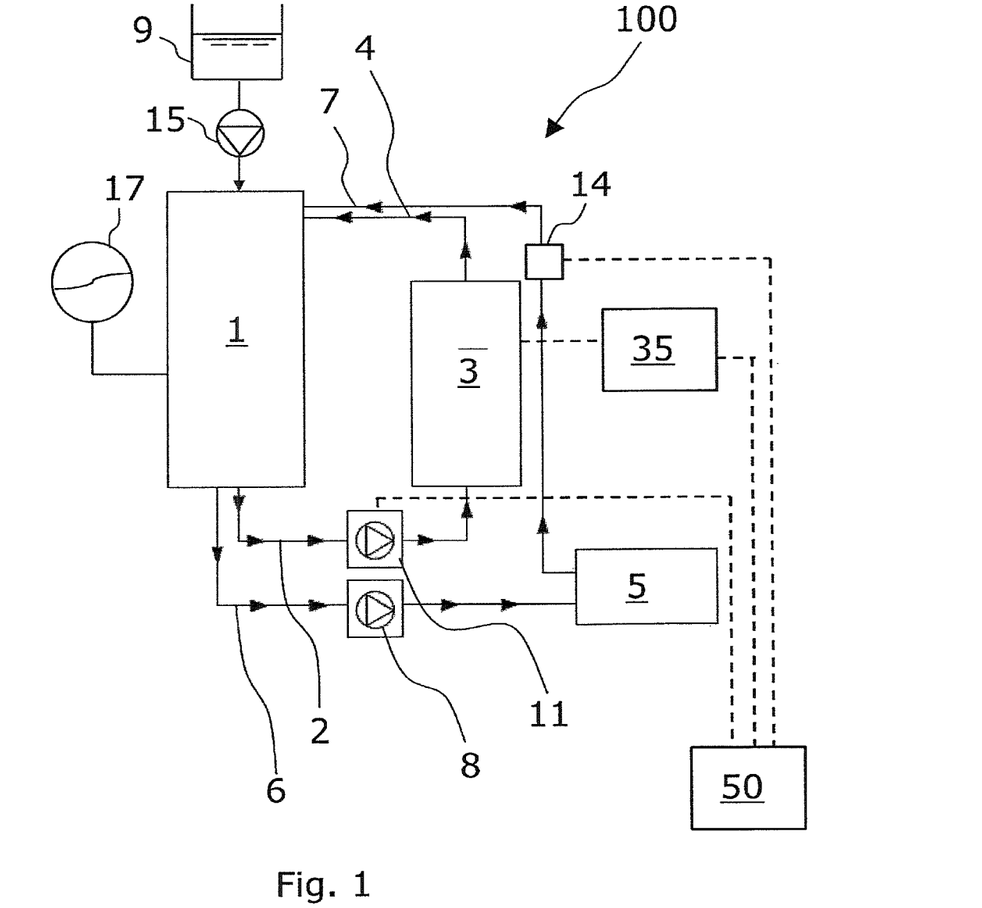
FIG. 1 is a schematic view a system comprising an apparatus according to an example embodiment of the invention.

FIG. 1 is an overview of the system according to an example embodiment of the present invention illustrating how the device and the method work in increasing the gaseous content of the hydrocarbon fuel for combustion engines. FIG. 1 shows a tank 1 for temporary storage of hydrocarbon fuel and illustrates a first conduit 2 that guides the fuel into a treatment unit 3 via a circulation pump 11. In the treatment unit 3 the fuel is treated by exposure to an electromagnetic field, to and charging and discharging current and electricity in the chambers with the electromagnetic field in between the fuel particles, or molecule chain. The treated fuel and is then passed back to the tank 1 from the treatment unit 3 through a return conduit 4.

Additional hydrocarbon fuel may be fed from a fuel tank 9 to the temporary storage tank 1 by activation of the pump 15. Since the temporary tank 1 may be pressurized due to the generation of gaseous fuel an accumulator 17 is connected to temporary tank 1 so as to absorb volume fluctuations and thereby even out pressure fluctuations in the tank 1 and in the conduits connected thereto. In an embodiment the apparatus 100 is provided with an emergency pressure relief valve (not shown) and with a pressure control valve, for regulating over pressure or under pressure in the tank 1, where the under pressure has the purpose to fill up the same tank 1 with new fuel to compensate for consumed fuel, for keeping the pressure in the temporary storage tank 1 and the system below a safe pressure threshold is not exceeded.

The hydrocarbon fuel is pumped by pump 11 via circulation conduit 2 from the temporary storage tank 1 into the treatment unit 3. In the treatment unit, which is described in greater detail further below the gaseous content of the hydrocarbon fuel is increased and the hydrocarbon fuel with the increased gaseous content is led to the temporary storage tank 1 via circulation conduit 4. The temporary storage tank 1 therefore contains a mixture of hydrocarbon fuel that has been treated in the treatment unit 3 and untreated hydrocarbon fuel. The apparatus that combusts the fuel, e.g. an internal combustion engine 5 draws fluid from the temporary storage tank 1 via a fuel supply line 6 and fuel pump 8. In case of the user of the fuel being an internal combustion engine 5, this engine 5 will receive the fuel from the temporary fuel tank in its fuel injection system with a fuel injection pump and injection nozzles as known in the art. Excess fuel delivered to the internal combustion engine 5 is returned to the temporary storage tank via a fuel return conduit 7. The fuel return, 7 is provided with a pressure regulation valve 14 that in an embodiment can be controlled by an electronic control unit 50.

The control unit 50 is also connected to the circulation pump 11 and to the current generator 35. The control unit 50 is in an embodiment an electronic control unit 50 which is provided with a processor that is configured to control and operate the devices that are connected to the control unit 50, and in an embodiment also in relation to information received from sensors.

The electronic control unit 50 is in an embodiment also configured to control the current generator 35, i.e. to ensure that the fluctuating current has the appropriate profile, frequency and strength in relation to the amount of flow through the treatment unit 3. In an embodiment the electronic control unit is aware of the amount of flow through the treatment units via the setting (speed) of the circulation pump 11, which is also controlled by the electronic control unit 50.

In an embodiment the fuel treatment unit 3 may be made from two or more tubes inside each other made from non-magnetic material, such as stainless steel, and where a surface of the outermost tube is coated with aluminum particles of a few millimeters in diameter or some other material facilitating ionic exchange. The aluminum particles are insulated from the surface of the adjacent tube with insulations such as the ceramic layer. The aluminum may be grounded to release charge. Two of the tubes are connected to power supply for supplying a pulsed charge stemming from collapsed magnetic fields in the tubes functioning as inductive coils. Also at both ends of the tubes in the fuel treatment unit powerful magnets may be arranged on each side of the fuel treatment unit in the pole orientation south to south. The magnets may orient the magnetic spin of the fuel molecules due to the applied outer magnetic field from the permanent magnets. The permanent or electromagnetic field and the pulsed electromagnetic field in conjunction will affect the stability of the fuel molecules chain, so when they pass by the carbon particles one or more of the hydrogen electrons in the fuel molecules may be discharged.

Figure 2:
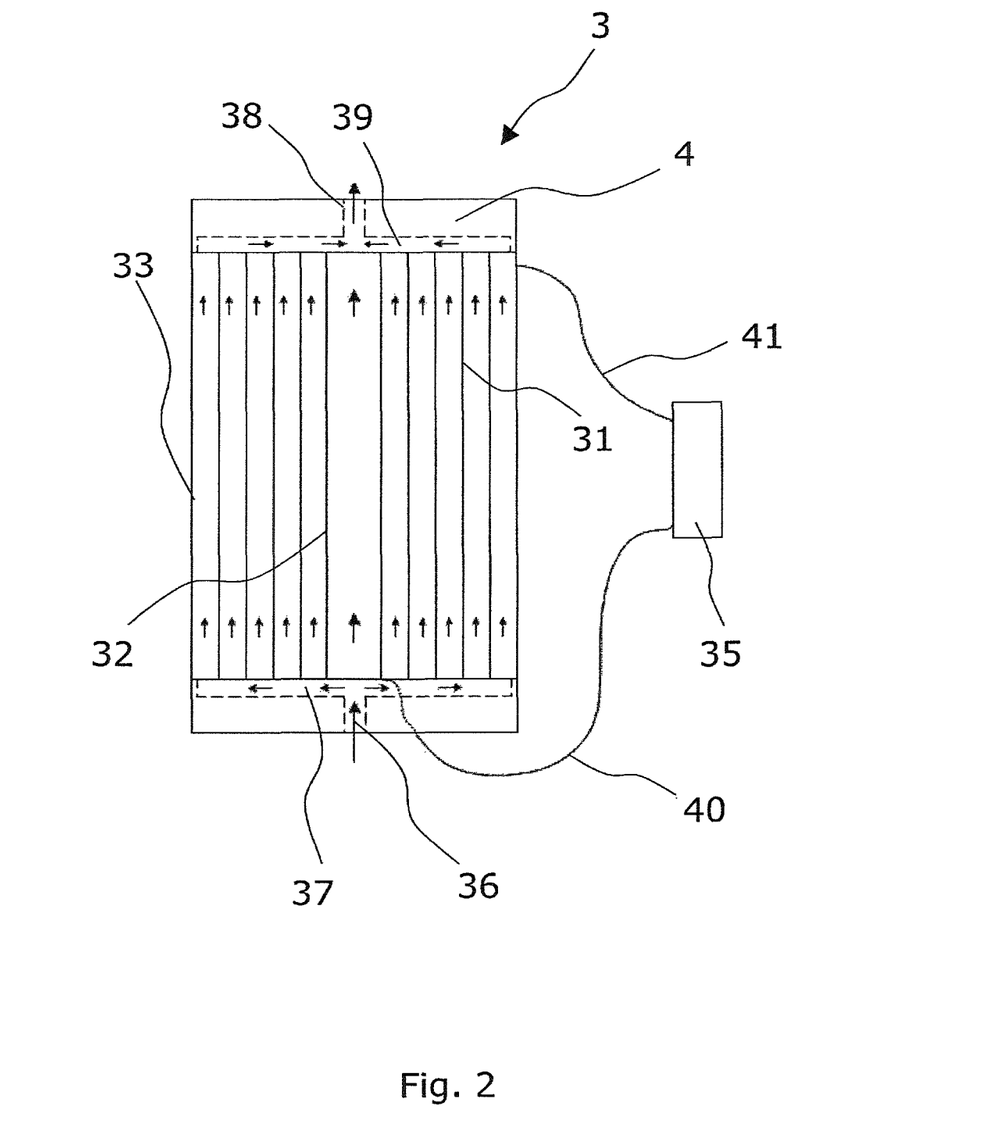
FIG. 2, is a sectional view of a treatment unit according to an example embodiment of the invention.
Figure 3:
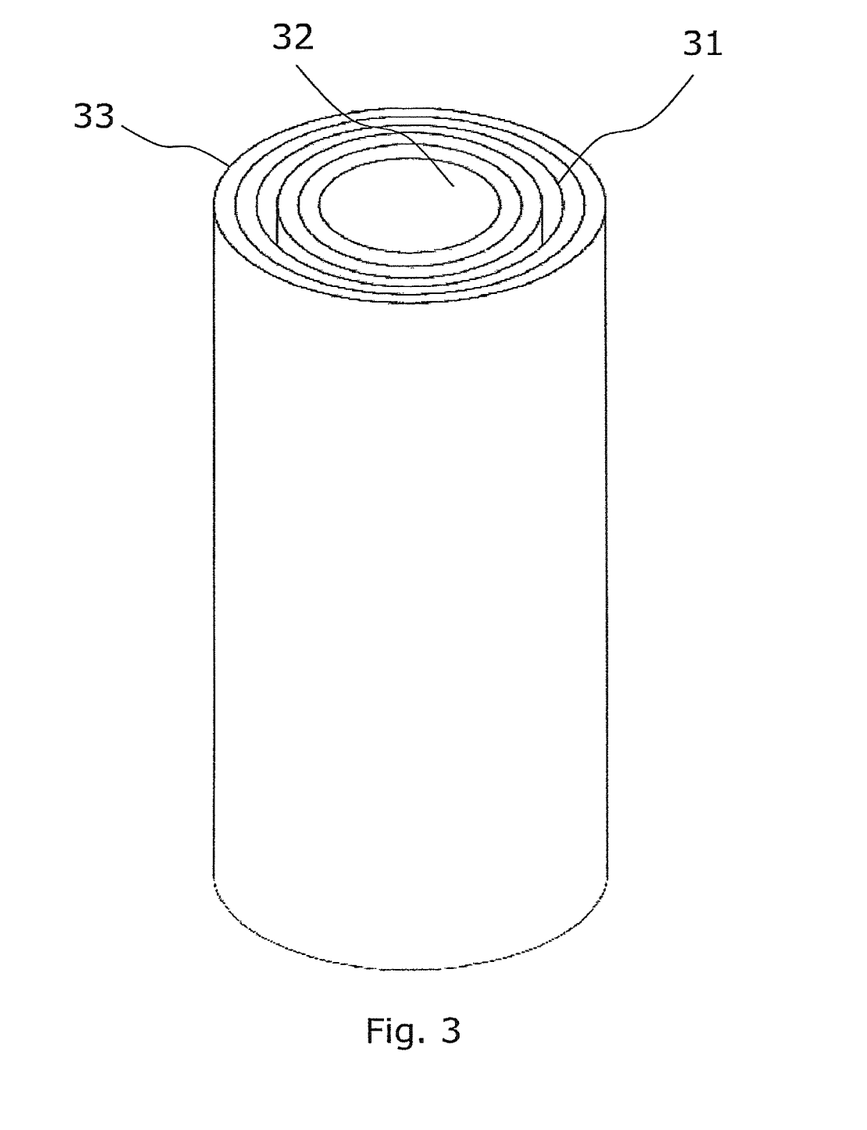
FIG. 3 is a perspective view of an assembly of tubes of a treatment unit according to an example embodiment of the invention.

FIG. 2 shows a schematic drawing of an example embodiment of the treatment unit 3, which serves the purpose of treating the hydrocarbon fuel such that the gaseous content of the fuel is increased. The treatment unit 3 comprises two or more circular cross-sectional tubes 31 of different diameter and of substantially equal length arranged in length alignment and arranged concentrically, wherein the tube with the smallest diameter is arranged innermost within the tubes having larger diameters and wherein the tube with the largest diameter is arranged outermost surrounding the tubes having smaller diameters, the tubes defining a plurality of intermediary spaces between the tubes. An innermost tube 32 and an outermost tube 33 define a space between the innermost tube and the outermost tube for receiving the hydrocarbon fuel. Also, in an embodiment the innermost tube and the outermost tube are electrically connected to an electrical current generator 35 capable of supplying a pulsed electromagnetic field to the hydrocarbon fuel being present in the space between the innermost and outermost tube since the innermost tube is connected to a pole 40 (for example a positive pole) of electrical current generator 35 and the outermost tube is connected to a pole 41 (for example a negative pole) of the electrical current generator 35. Also the treatment unit 3 comprises an inlet 36 for letting the hydrocarbon fuel into the treatment unit and a distribution chamber 37 for distributing the flow of the hydrocarbon fuel between the intermediary spaces. To ensure a good distribution of the mixed fuel in the treatment unit 3 the distribution chamber ensures optimal distribution in the plurality of intermediary spaces between the plurality of tubes 31. At the other end of the plurality of tubes the treatment unit is equipped with an outlet 38 for letting a treated hydrocarbon fuel out from the treatment unit and a collecting chamber 39 for collecting the flow of the treated hydrocarbon fuel from the intermediary spaces, FIG. 3 shows an assembly of six tubes 31 having a circular cross-section. The six tubes 31 have different diameters and substantially equal lengths. Furthermore, it is shown in FIG. 3, that the tubes are arranged in length alignment, and are arranged concentrically with said tubes defining a plurality of intermediary spaces, thus providing flow paths for the hydrocarbon fuel between the tubes. The perspective view of the assembly in FIG. 3 is not truly three-dimensional, but for the purpose of explaining the assembly of tubes 31 this perspective view is sufficient.

In another embodiment of the invention a hydrogen oxygen gas enters the treatment unit trough an isolated tube and fills a specific chamber of the treatment unit. This chamber is advantageously the space between the largest and second largest tubes in the treatment unit and preferably contains metal particles such as Aluminum or Iron particles. Also this chamber should be separated from inner tubes with an insulation tube e.g. made from textolite or ceramic material. The innermost tube may contain activated carbon.

In an example embodiment the inside of the outermost tube is provided with metal particles such as Fe or Al particles. Permanent magnets or electromagnets may furthermore be arranged at one end of the treatment unit to provide an oriented magnetic field to provide the molecules in the treatment unit with the same magnetic spin orientation. The inside of the outermost tube may also comprise non-metal particles.

Tests have shown that treating the hydrocarbon fuel using the above described apparatus may lead to significant reductions in fuel consumption. Because better conditioned fuel is provided, with smaller chain particles glued with gas from hydrocarbon fuel, the fuel is in a much better condition for burning because of improved oxidizing conditions and improved mixing with (oxygen) from the air.

The tube assembly of two or more tubes 31 arranged between the inlet 36 and the outlet 38 comprises two or more tubes 31 with different diameters and the tubes have substantially equal lengths. The tubes are arranged in length alignment such that they superimpose in the longitudinal direction, i.e. the tubes are opposite each other in the longitudinal direction of the tubes. Furthermore, the tubes 31 are arranged concentrically thereby defining a plurality of intermediary spaces. The innermost tube is the tube having the smallest diameter. Surrounding the innermost tube is the tube having the second smallest diameter. The difference between the diameter of smallest and second smallest tube must be sufficiently large to provide an intermediary space between the smallest and second smallest tube when arranged concentrically in the treatment unit 3 thus providing a flow path for the hydrocarbon fuel between the smallest and second smallest tube. Likewise the tube having the second smallest diameter and the tube having the third smallest diameter must have a difference sufficiently large to provide an intermediary space between the second smallest and third smallest tube when arranged concentrically in the treatment unit 3 and the same applies mutatis mutandis to the rest of the tubes in the treatment unit.

The fluctuating current causes a resonance on the tubes 31, 32, 33 that is closely connected to the flow of the fluid between the tubes. This resonance on the plate material of the tubes is very closely connected with the flow of fluid in between them. For example, if a flow without resonance is used through the intermediate spaces, this can also provide some separation of gas in the liquid because by a flow condition is obtained of different resistance in the fluid and even fuel with almost no conductivity in the liquid can have some and this is placed like a charge on the capacitor plate.

In an embodiment, liquid fuel is transformed to gaseous fuel in two different ways by adding a little extra energy to the process or by discharging the energy from the bonds between the molecules. In the case where the system is used to get a charge out of the liquid fuel it can be expected that significantly less gas outlet forms compared to when charging the liquid hydrocarbon fuel with an electrical current with a flow specific resonance frequency.

Diesel liquid fuel has almost no conductivity and resistance is very large because it is almost an insulator and if it is almost impossible to add some electricity inside of the liquid. This is a main reason why the charging process does not use a huge amount of energy. Simultaneously, by applying resonance in the treatment unit 3 where liquid fuel is in a state of fast flowing through the chamber and bonds in between are already bent and at the same time partly destroyed, the fuel chain in the other structure results in more gas than liquid resulting. This gas is still blended with part of liquid like for example soap. This gas is a mix of different kind of gases and a liquid component with a very thin liquid surface around the clusters with gas molecules.

Separation of the fuel or gas extracting from the fuel can be performed with any known method, as described in the following examples.

Liquid fuel diesel oil is a fuel with low density comparable to water and this kind of fuel is a very stable fuel in everyday use, but at in some critical states, for example at the boiling point, the frosting point or flammable point the same fuel changes condition or state of matter. With the same condition of changing, the energy that is used to extract or add inside is used to change the state of matter from the liquid to the gas with resonance.

Resonance is a vibration at a frequency that can cause liquid to vibrate where liquids usually tend to become of smaller of parts such as droplets and they are going to be dissolved by cracking the bonds in between the parts of the molecule chain, and this effect is visible like gas like foam in the temporary storage tank 1.

When the fuel passes through the (high-speed) circulation pump 11 there can also be cavitation caused by the impeller of the pump and this cavitation can also cause partially dissolving liquid into gas form.

The same liquid is partly mixed with already dissolved gases is passing through the treatment chamber 3, with the gases already present in the liquid hydrocarbon fuel.

This mixture of liquid hydrocarbon fuel and gaseous hydrocarbon fuel passes the inside of the treatment unit 3 with its charged surfaces with high voltage pulse with a frequency adapted to the flow.

Under normal condition when this mixture passes through the treatment unit without applying electrical current to it, it cannot be expected that any special results are achieved regarding the gasification of the hydrocarbon liquid fuel because liquid hydrocarbon fuel does not have any chance to get charged with the electrons from the treatment unit 3 or discharged from the same because of the low conductivity of the hydrocarbon fuel so the fuel is acting as a resistor or isolator.

However, if the hydrocarbon fuel is simultaneously passed through the impeller of the circulation pump 11 with high-speed there will be cavitation bubbles in the liquid which changes the conductivity and resistance of the fuel and allows the fuel to be charged, discharged or played with resonance and the conditions in the treatment unit are changed in relation to the flow through the circulation pump 11.

Exposing the fuel to cavitation before it enters the treatment unit 3 reduces the attraction between the hydrogen and carbon molecules and when this fuel is passed through the treatment unit 3 and a fluctuating current is applied to this fuel and the partial gases fuel mixture, the frequency and electrons from the orbits are going to be shifted or kicked out from their previous positions and when this starts to happen a condition is obtained that is different from normal hydrocarbon fuel, and lipids mixed with a few different types of gas together with the part of liquid still inside are obtained.

This part of liquid can be completely moved out if it is desirable to use it for some other purpose and it is possible produce pure gas with the some hardness like lipids from the hydrocarbon fuel.

This means that this is ruled by several different conditions and these conditions are: cavitation in the pump 11, speed of the flow in the chamber, and the signal used to charge the tubes in the treatment unit 3 need to be perfectly adjusted with other in order to get as much as possible resonance in the liquid part of the hydrocarbon fuel.

The resonance like a high charged energy concentrated at the electrons inside of the fuel causes dissolving in the combination of gas and liquid part.

The process can also be used in the chemical industry or in refineries to improve the efficiency of the fuel without hardly having to put any energy into the process of improving the quality of the fuel.

It is very difficult to separate the bonds in between the chain of molecules without temperature or energy used like input to the system. The present technology is different from conventional technology and uses at least 80% less than conventional technologies without any pollution at all.

The treated fuel with a higher gaseous content reduces emissions, pollution and improves the fuel efficiency.

In an embodiment of the present invention the treatment unit is made from stainless steel tubes.

In an embodiment of the present invention the separation material in the treatment unit is made from thin wire of natural silk to provide smaller particles of water to the surface of the tube.

In an embodiment a surface on an inside of the outermost tube of the device is coated with metal particles.

In an embodiment the outermost tube is insulated from the adjacent tube with an electrically insulating material.

In an embodiment two or more permanent magnets in pole orientation south to south are arranged in an end of the tubes closest to the inlet of the fuel, and the permanent magnets are arranged on two opposite sides of the tubes with the south pole orientation of the permanent magnets facing the tubes.

In an embodiment a surface on an outside of at least one of the inner tubes includes activated carbon.

In an embodiment the treatment unit is made from tubes of stainless steel.

In an embodiment the treatment unit further comprises a treatment material arranged in the intermediary spaces in between the tubes.

In an embodiment the treatment material in the treatment chamber is thin wire of natural silk.

In an embodiment the metal particles in the treatment unit 3 are selected from, but not limited to Al, Si, Zn, FeO and CuO.

In the embodiment the metal particles in the treatment unit 3 are grounded to release charge.

In an embodiment the treatment unit furthermore comprises a fuel processor unit in the innermost intermediary space of the treatment unit.

In an embodiment of the present invention the filling of the fuel may be provided with a controlled dosing unit for fuel.

In an embodiment of the present invention two of the tubes are connected to a power supply with pulsed charge from collapsed inductive coil.

In an embodiment of the present invention an electrical power supply may supply a pulsed charge providing conditioning of fuel having frequencies between 40 kHz and 450 kHz, such as 124, 168, 196 kHz of pulsing electrical current generated in resonance with the fuel. In an example embodiment two different frequencies are generated simultaneously in the two treatment units and these frequencies try to reach an equilibrium in between them by resonance.

It is sufficient for the electric current generator to use a relatively weak output power typically below 50 W. The electric current generator may therefore in an embodiment be powered by a standard passenger car generator and battery.

In an embodiment of the present invention the inside of the outermost tube of the fuel processor unit is coated with metal particles such as, but not limited to Al, Si, Zn, FeO and CuO, but for same purpose materials like e.g. minerals (zeolite) can be used. The particles have the purpose of increasing the surface of the tube and the discharge part of the ion on the molecules.

Although the fuel treatment apparatus according to the disclosed example embodiments has been shown as an integral part of a combustion engine, it is understood that the apparatus could be used for providing enhanced hydrocarbon fuel for any other fuel combusting device and the treatment apparatus does not need to be closely associated with the fuel combusting device, e.g. the device could also be used in connection with the treatment of fuel taking place in a fuel processing plant such as e.g. an oil refinery.

The term "comprising" as used in the claims does not exclude other elements or steps. The term "a" or "an" as used in the claims does not exclude a plurality.

The reference signs used in the claims shall not be construed as limiting the scope.

Although the present invention has been described in detail for purpose of illustration, it is understood that such detail is solely for that purpose, and variations can be made therein by those skilled in the art without departing from the scope of the invention.

What is claimed is:

1. A combination of a hydrocarbon fuel burning apparatus and an apparatus for increasing a gaseous content of hydrocarbon fuel, said apparatus comprising:
   a source of liquid hydrocarbon fuel,
   a treatment unit for treating said hydrocarbon fuel, said treatment unit comprising:
      an inlet for receiving said hydrocarbon fuel into the treatment unit, and
      an outlet for discharging a treated hydrocarbon fuel from the treatment unit to the hydrocarbon fuel burning apparatus,
   a pump for supplying a flow of hydrocarbon fluid to said inlet,
   said treatment unit further including an assembly of at least two tubes of a non-magnetic material, said at least two tubes each having a circular cross-section, and said assembly being arranged between said inlet and said outlet,
   said at least two tubes have different diameters, have substantially equal lengths, are arranged in length alignment, and are arranged concentrically with each other so as to define a plurality of intermediary spaces therebetween serving as flow paths for said hydrocarbon fuel solely in an axial direction between said inlet to said outlet,
   an inner one of said at least two tubes and an outer one of said at least two tubes being electrically connected to an electrical current generator,
   said electrical current generator is configured for supplying a fluctuating current with said inner tube being connected to one pole of said electrical current generator and said outer tube being connected to another pole of said electrical current generator to thereby increase the gaseous content in hydrocarbon fuel through said intermediate spaces, and
   said electrical current generator being configured to adapt the generated current to the magnitude of the flow of hydrocarbon fluid to said inlet.

2. The apparatus according to claim 1, further comprising a control unit connected to said pump and to said treatment unit, said control unit being configured to control a speed of said pump and configured to adapt the fluctuating current generated by said current generator in accordance with an output of the pump.

3. The apparatus according to claim 1, further comprising a temporary storage tank comprising a treated and not treated hydrocarbon fuel, a first conduit connected with said pump therein and connecting said temporary storage tank to the inlet of the treatment unit and a second conduit connecting the outlet of the treatment unit to said temporary storage tank.

4. The apparatus of claim 3, wherein said temporary storage tank is adapted to be pressurized and further comprising an accumulator operatively connected to said temporary storage tank in order to level out pressure fluctuations in said temporary storage tank.

5. The apparatus according to claim 4, further comprising at least one pressure sensor that provides a signal indicative of pressure in said temporary storage tank.

6. The apparatus according to claim 2, wherein said control unit is configured to control the output of the pump and configured to adjust the fluctuating current to the magnitude of the output of said pump.

7. The apparatus according to claim 3, further comprising an atmospheric pressure fuel tank that is connected to the temporary storage tank and a pump that is arranged to pump fuel from the atmospheric pressure tank to the pressurized temporary storage tank.

8. The apparatus according to claim 3, wherein the fluctuating current is a pulsed current with two phase shifted waves that are slightly different in frequency so as to cause resonance.

9. The apparatus according to claim 3, wherein the fluctuating current comprises two different phase currents with different modulation and different frequency with the fuel by passing through the intermediary spaces attempting to reach a resonance frequency in between them and to arrive at an equilibrium, thereby causing chains of fuel molecules to be divided into smaller portions of molecule chains with some released and gas mixed into the liquid part of the fuel.

10. A method of treating liquid hydrocarbon fuel for increasing a gaseous content of hydrocarbon fuel for use with internal combustion engines, boilers, heating units, gas turbines or any other hydrocarbon fuel burning apparatus, said method comprising the steps of:
   providing a treatment unit for treating said hydrocarbon fuel, said treatment unit comprising:
      an inlet for receiving said hydrocarbon fuel into the treatment unit,
      an outlet for discharging a treated hydrocarbon fuel from the treatment unit to the hydrocarbon fuel burning apparatus, and
      an assembly of at least two tubes of a non-magnetic material, said at least two tubes each having a circular cross-section, and said assembly being arranged between said inlet and said outlet,
   said at least two tubes have different diameters, have substantially equal lengths, are arranged in length alignment, and are arranged concentrically with each other so as to define a plurality of intermediary spaces therebetween serving as flow paths for said hydrocarbon fuel solely in an axial direction between said inlet to said outlet, pumping a flow of hydrocarbon fluid to said inlet,
   connecting an inner one of said at least two tubes and an outer one of said at least two tubes electrically to an electrical current generator,
   supplying a fluctuating current with said current generator with said inner tube being connected to one pole of said electrical current generator and said outer tube being connected to another pole and simultaneously flowing said hydrocarbon fuel through said intermediary spaces to thereby increase the gaseous content in hydrocarbon fuel, and
   adapting the generated current to the magnitude to the flow of hydrocarbon fluid to said inlet.

* * * * *